United States Patent Office 3,053,705
Patented Sept. 11, 1962

3,053,705
FUSED SALT BATHS FOR HEAT TREATMENT OF Ti AND Ti ALLOYS
Robert Leslie Hewson and Frederick David Waterfall, Birmingham, England, assignors to Imperial Chemical Industries Limited, London, England, a corporation of Great Britain
No Drawing. Filed Apr. 22, 1959, Ser. No. 808,003
Claims priority, application Great Britain May 7, 1958
6 Claims. (Cl. 148—28)

This invention relates to fused salt baths of novel composition for the heat treatment of titanium and alloys of titanium, to mixtures adapted to produce on heating such fused salt baths and to the heat treatment of titanium and alloys thereof by heating the same in such fused salt baths.

There is a demand at the present time for fused salt baths for the heat treatment of titanium and alloys thereof. These fused salt baths should be such that they are operable at the temperatures at which it is desired to carry out the heat treatment and they should not attack the titanium. Also, there is always the consideration that the mixture of salts, which is adapted on fusion to yield the fused bath, should be as inexpensive as possible so as to cut down the expense of heat treating the titanium or titanium alloy. Fused salt baths consisting of 56% potassium carbonate and 44% sodium carbonate are operable at one range of temperatures, namely, 800° C. to 950° C., at which titanium may be heat-treated but are unsatisfactory in that the titanium is badly attacked by the fused mixture.

According to the present invention we claim a composition adapted to produce on fusion a fused salt bath for the heat treatment of titanium and alloys thereof which composition consists essentially of potassium carbonate and/or sodium carbonate together with at least 6% of the total weight of the bath of lithium carbonate, which composition also melts at a temperature of at least 420° C.

The mixture adapted to produce the salt baths of the invention are non-eutectic mixtures, that is, they do not have a precise melting point but melt over a range which can be quite large depending on the actual composition of the mixtures. The upper limit of the melting range is in fact the temperature at which a solid phase freezes out from the molten mixture of the salts. The lower limit of the melting range is the temperature at which the last liquid freezes, but we are not concerned herein with this temperature. Accordingly it is to be understood when we say that the mixture of salts of the present invention melts at a temperature of at least 420° C. we mean that this is the temperature just above that at which a solid phase starts to freeze out on cooling from the molten mixture. At such temperatures of 420° C. or higher the mixture of salts which we claim can be truly described as molten.

The term "consists essentially of" as applied to the fused salt baths and compositions adapted to produce on heating the fused salt baths or compositions which contain potassium carbonate and/or sodium carbonate together with lithium carbonate as their essential or active components but which can also contain small proportions of inactive materials, for instance, such materials as may be present as impurities in commercial grades of the specified essential components.

Generally we find that salt baths containing the broad range of proportions, 6% to 20% of lithium carbonate may be employed at temperatures of approximately 850° C. but the finish of the treated article is improved as the lithium carbonate content is increased above 6%. In particular we find that we obtain good results with a good surface finish if the proportion of lithium carbonate is in the approximate range 10% to 20% by weight of the bath. Also we find that while lithium carbonate contents in the lower values of the above range give satisfactory results, comparable results may not be obtained with these lower values when the bath is operated at a temperature of 900 C. to 950° C. With baths at the latter temperatures somewhat higher figures for lithium carbonate content, for instance, approximately 15% or more, are required to give good results. Somewhat higher figures than 20% lithium carbonate may be employed in the baths of the present invention, for instance up to 25%, although usually there is no appreciable improvement in the baths as the lithium carbonate content is increased above 20%.

Specific salt mixtures (with details of their chemical composition and the temperature at which commencement of freezing occurs) which we have found useful for the heat treatment of titanium and titanium alloys are given in the table below:

| Composition | | | Commencement of Freezing ° C. (above which mixtures are molten) |
|---|---|---|---|
| Percent $Li_2CO_3$ | Percent $K_2CO_3$ | Percent $Na_2CO_3$ | |
| 6 | 53 | 41 | 624 |
| 6 | 94 | | 801 |
| 6 | | 94 | 803 |
| 10 | 50 | 40 | 596 |
| 15 | 48 | 37 | 535 |
| 15 | | 85 | 720 |
| 20 | 45 | 35 | 485 |

According to other features of the invention we claim fused salt baths obtained by fusing such hereinbefore described mixtures and also methods for the heat treatment of titanium and titanium alloys which comprises heating the titanium or titanium alloy in fused salt baths obtained by fusing such hereinbefore described mixtures.

The following examples illustrate the invention. Where percentages are mentioned they are by weight.

*Example 1*

A fused salt bath containing 6% $Li_2CO_3$, 53% $K_2CO_3$ and 41% $Na_2CO_3$ was maintained at a temperature of 850° C. and test pieces of titanium were immersed in the bath for a period of 10 minutes and for a period of 30 minutes.

Other fused salt baths containing 10% $Li_2CO_3$, 50% $K_2CO_3$ and 40% $Na_2CO_3$; 15% $Li_2CO_3$, 48% $K_2CO_3$ and 37% $Na_2CO_3$; 20% $Li_2CO_3$, 45% $K_2CO_3$ and 35% $Na_2CO_3$; 25% $Li_2CO_3$, 42% $K_2CO_3$ and 33% $Na_2CO_3$ (melting at 436° C.); 6% $Li_2CO_3$ and 94% $K_2CO_3$; 6% $Li_2CO_3$ and 94% $Na_2CO_3$ were also maintained at 850° C. and test pieces of titanium were immersed in these baths for a period of 10 minutes and for a period of 30 minutes.

With the bath containing 6% lithium carbonate it was found that the surface of the test pieces was fairly satisfactory and that the finish improved with increasing the lithium carbonate content up to 20%. With the bath containing 25% lithium carbonate there did not appear to be any further appreciable improvement in the surface finish of the titanium pieces.

*Example 2*

Fused salt baths containing 6% $Li_2CO_3$, 10% $Li_2CO_3$, 15% $Li_2CO_3$ and 20% $Li_2CO_3$ and both potassium carbonate and sodium carbonate in the amounts described in the previous example, were maintained at a temperature of 900° C. and at a temperature of 950° C. A bath containing 15% $Li_2CO_3$ and 85% $Na_2CO_3$ was also maintained at the latter temperature. Test pieces of titanium were immersed in the baths for a period of 10 minutes and for a period of 30 minutes at both temperatures. With the baths containing 15% lithium carbonate and more the surface finish of the titanium test pieces was found to be satisfactory, but the surface finish of the titanium test pieces treated in the baths containing 6% Li$_2$CO$_3$ and 10% Li$_2$CO$_3$ were found to be less satisfactory.

*Example 3*

A fused salt bath containing 20% Li$_2$CO$_3$, 45% K$_2$CO$_3$ and 35% Na$_2$CO$_3$ was maintained at a temperature of 900° C. Test pieces of a titanium alloy containing 92½% titanium, 5% aluminium and 2½% tin were immersed in the bath for a period of ½ hour. The test pieces were then removed and it was found that the surface finish of the pieces was quite satisfactory.

*Example 4*

The fused salt bath of Example 3 was maintained at a temperature of 850° C. Test pieces of a titanium alloy containing 90% titanium, 6% aluminium and 4% vanadium were immersed in the bath for a period of ½ hour. The test pieces were then removed and it was found that the surface finish of the pieces was quite satisfactory.

What we claim is:

1. A process for heat treating a metal selected from the group consisting of titanium and titanium alloys which comprises heating said metal in a fused salt bath consisting essentially of at least one carbonate selected from the group consisting of potassium and sodium carbonates together with at least 6% of the total weight of the bath of lithium carbonate, said bath having a melting point of at least 420° C.

2. A process according to claim 1 in which the temperature of the bath is approximately 850° C. and in which the proportion of lithium carbonate present is in the approximate range 10% to 20% by weight of the bath.

3. A process according to claim 1 in which the temperature of the bath is in the approximate range 900° C. to 950° C. and in which the proportion of lithium carbonate present is in the approximate range 15% to 20% by weight of the bath.

4. A composition adapted to produce on fusion a fused salt bath for the heat treatment of titanium and alloys thereof consisting essentially of 6%–25% by weight of lithium carbonate and a member of the group consisting of sodium carbonate and a mixture of sodium carbonate with potassium carbonate, which composition melts at a temperature of at least 420° C.

5. A composition according to claim 4 wherein the proportion of lithium carbonate present is in the approximate range 10% to 20% by weight of the bath.

6. A fused salt bath for the heat treatment of titanium and alloys thereof consisting essentially of 6%–25% by weight of lithium carbonate and a member of the group consisting of sodium carbonate and a mixture of sodium carbonate with potassium carbonate, said bath having a melting point of at least 420° C.

References Cited in the file of this patent

UNITED STATES PATENTS

| | | |
|---|---|---|
| 683,490 | Pflieger | Oct. 1, 1901 |
| 1,989,884 | Reinhardt | Feb. 5, 1935 |
| 2,174,867 | Bellis | Oct. 3, 1939 |
| 2,237,434 | Holden et al. | Apr. 8, 1941 |
| 2,249,581 | Solakian | July 15, 1941 |
| 2,723,928 | Fisher et al. | Nov. 15, 1955 |
| 2,818,041 | Chill et al. | Dec. 31, 1957 |

OTHER REFERENCES

International Critical Tables, McGraw-Hill, vol. IV, p. 67, 1928.

Chemical Abstracts, vol. 20, page 2614, lines 10–17, 1926.